(12) United States Patent
Menard et al.

(10) Patent No.: US 12,145,054 B2
(45) Date of Patent: Nov. 19, 2024

(54) MOTION TRACK GENERATION FOR MOTION PLATFORM

(71) Applicant: D-BOX TECHNOLOGIES INC., Longueuil (CA)

(72) Inventors: Jean-François Menard, Longueuil (CA); Philippe Roy, St-Bruno (CA); Robert Desautels, Longueuil (CA)

(73) Assignee: D-BOX TECHNOLOGIES INC., Longueuil (CA)

( * ) Notice: Subject to any disclaimer, the term of this patent is extended or adjusted under 35 U.S.C. 154(b) by 216 days.

(21) Appl. No.: 17/703,003

(22) Filed: Mar. 24, 2022

(65) Prior Publication Data

US 2022/0305379 A1    Sep. 29, 2022

Related U.S. Application Data

(60) Provisional application No. 63/165,304, filed on Mar. 24, 2021.

(51) Int. Cl.
| | |
|---|---|
| *A63F 13/28* | (2014.01) |
| *A63F 13/54* | (2014.01) |
| *G06F 3/01* | (2006.01) |

(52) U.S. Cl.
CPC ............ *A63F 13/28* (2014.09); *A63F 13/54* (2014.09); *G06F 3/011* (2013.01)

(58) Field of Classification Search
CPC ........... A63F 13/28; A63F 13/54; G06F 3/011
See application file for complete search history.

(56) References Cited

U.S. PATENT DOCUMENTS

| 4,066,256 A | * | 1/1978 | Trumbull | A63G 31/16 472/60 |
|---|---|---|---|---|
| 4,752,065 A | * | 6/1988 | Trumbull | A63G 31/16 472/60 |
| 5,009,412 A | * | 4/1991 | Roodenburg | A63G 31/00 472/136 |
| 5,162,986 A | * | 11/1992 | Graber | G05B 19/4147 700/17 |
| 5,192,247 A | * | 3/1993 | Barr | A63J 25/00 472/60 |
| 5,282,772 A | * | 2/1994 | Ninomiya | A63G 31/16 104/73 |
| 5,499,920 A | * | 3/1996 | Trumbull | A63G 31/16 472/60 |

(Continued)

*Primary Examiner* — Steve Rowland
(74) *Attorney, Agent, or Firm* — NORTON ROSE FULBRIGHT CANADA LLP

(57) ABSTRACT

A method of producing a motion track for displacing a motion platform substantially synchronously with a predetermined media content may include: obtaining the media content; in response to receipt of the media content, generating a timeline for the media content based at least in part on a duration of the media content; receiving user input indicative of a plurality of motion samples to be added to the timeline, each associated with a respective point on the timeline; placing each of the motion samples on the timeline at the respective associated point on the timeline; and storing the plurality of motion samples, each in association with a respective time code representative of the respective associated point on the timeline of each of the motion samples, as part of the motion track.

10 Claims, 5 Drawing Sheets

(56) References Cited

U.S. PATENT DOCUMENTS

| | | | | |
|---|---|---|---|---|
| 5,768,122 | A * | 6/1998 | Motoc | G05B 19/416 |
| | | | | 706/900 |
| 11,847,388 | B2 * | 12/2023 | Sovani | B29C 64/386 |
| 2011/0228962 | A1 * | 9/2011 | Taylor | G10H 1/0008 |
| | | | | 381/322 |
| 2012/0019352 | A1 * | 1/2012 | Menard | H04N 21/4302 |
| | | | | 340/4.2 |
| 2013/0107216 | A1 * | 5/2013 | Haight | A63F 13/28 |
| | | | | 352/1 |
| 2015/0048933 | A1 * | 2/2015 | Danieau | G08B 6/00 |
| | | | | 340/407.1 |
| 2018/0004291 | A1 * | 1/2018 | Dauhajre | H04L 67/01 |
| 2018/0049688 | A1 * | 2/2018 | Knight | G10L 25/63 |
| 2020/0012347 | A1 * | 1/2020 | Wu | G08B 6/00 |
| 2020/0250357 | A1 * | 8/2020 | Stevenson | G06F 30/15 |
| 2021/0409867 | A1 * | 12/2021 | Yoo | H04R 5/023 |
| 2022/0214749 | A1 * | 7/2022 | Park | A63F 13/355 |

\* cited by examiner

MOTION TRACK GENERATION FOR MOTION PLATFORM

CROSS-REFERENCE TO RELATED APPLICATION

The present application claims the priority of U.S. Patent Application No. 63/165,304, filed on Mar. 24, 2021 and incorporated herein by reference.

TECHNICAL FIELD

The present disclosure relates generally to motion platforms, and more specifically to techniques for generating motion tracks for motion platforms.

BACKGROUND OF THE ART

Motion simulators performing vibro-kinetic effects are commonly used to enhance a viewing experience of a video program. In such technology, a motion simulator features a seat or platform that is displaced by actuators in vibro-kinetic effects in synchronization with an audio-visual program or visual event. In a particular type of such motion simulators, the motion simulators move based on motion signals that are encoded as a motion track, in contrast to vibrations being extracted from a soundtrack of an audio-visual program.

Currently, motion track production is largely the work of professionals. For instance, companies that commercialize motion platforms employ professional motion track designers who produce a limited number of motion tracks, based on the resources of the company and using specialized tools. As a result, motion tracks are often not available for all media content, and consumers wishing to enjoy motion platforms are limited to certain media content. Moreover, the creation of a motion track is often related to a motion track designer's perception of a media content. The creation of a motion track is therefore subjective and some viewers may wish to create their own motion tracks.

It would be desirable to provide tools for motion track generation which could be widely used.

SUMMARY

In accordance with a broad aspect, there is provided a method of producing a motion track for displacing a motion platform substantially synchronously with a predetermined media content, comprising: obtaining the media content; in response to receipt of the media content, generating a timeline for the media content based at least in part on a duration of the media content; receiving user input indicative of a plurality of motion samples to be added to the timeline, each associated with a respective point on the timeline; placing each of the motion samples on the timeline at the respective associated point on the timeline; and storing the plurality of motion samples, each in association with a respective time code representative of the respective associated point on the timeline of each of the motion samples, as part of the motion track.

In accordance with another broad aspect, there is provided a non-transitory computer-readable medium having stored thereon computer instructions which, when executed by a processing unit, cause the processing unit to implement: obtaining the media content; in response to receipt of the media content, generating a timeline for the media content based at least in part on a duration of the media content; receiving user input indicative of a plurality of motion samples to be added to the timeline, each associated with a respective point on the timeline; placing each of the motion samples on the timeline at the respective associated point on the timeline; and storing the plurality of motion samples, each in association with a respective time code representative of the respective associated point on the timeline of each of the motion samples, as part of the motion track.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

Figure 1:
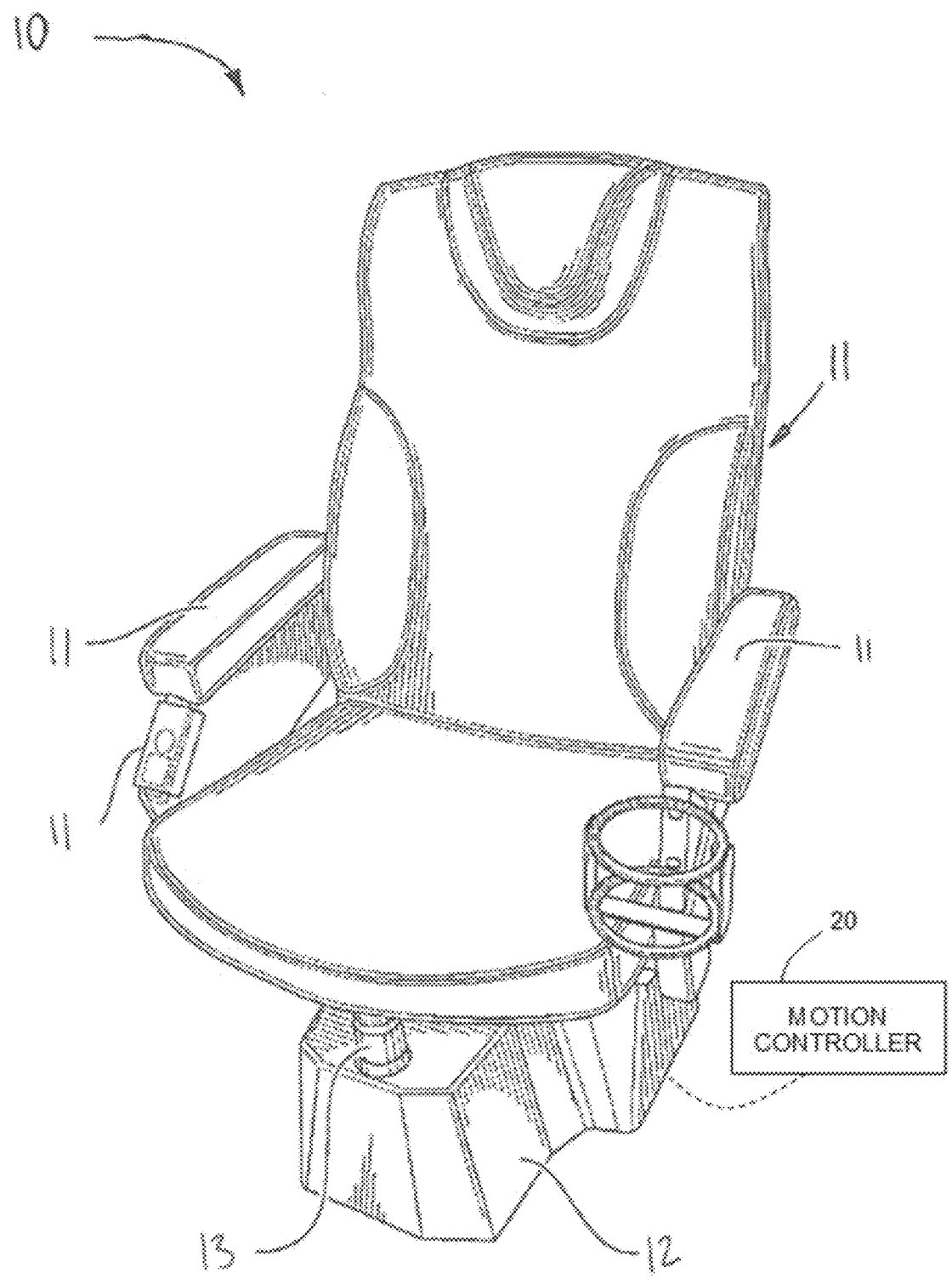
FIG. 1 is a perspective view of an embodiment of a motion platform actuated to produce vibro-kinetic effects in accordance with the present disclosure.

Referring to the drawings, and more particularly to FIG. 1, there is illustrated at 10 a motion platform outputting vibro-kinetic effects in synchronization with a video output, an audio output and/or a live event. By way of example, the motion platform 10 may include a motion simulator. The motion simulator is of the type that receives actuation signals so as to move an output thereof in accordance with a set of movements. The actuation signals may be known as motion signal, motion samples, motion code, and are representative of movements to be performed being received from a controller. In the illustrated embodiment, the motion simulator has a seat having a seat portion 11 in which a user(s) may be seated. Other occupant supporting structures may be included, such as a platform, but for simplicity the expression seat portion 11 will be used in the present application.

The seat portion 11 is shown as having armrests, a seat, and a backrest and this is one of numerous configurations considered, as the seat portion 11 could be for a single user, multiple users, may be a bench, etc. The motion simulator also has an actuation system 12 by which the output, namely the seat portion 11, is supported to the ground. The actuation system 12 is shown as having a casing hiding its various components, although a linear actuator 13 is partly visible. The actuation system may have one or more of these linear actuators 13, supporting the output, i.e., the seat portion 11, from the ground. The seat portion 11 may also be supported by a seat leg, column or post with passive joint(s) in parallel arrangement with the linear actuator(s) 13. In an embodiment, the linear actuator 13 is an electro-mechanical actuator of the type having a ball-screw system, although other types of linear actuators may be used. For example, a single one of the linear actuators 13 can produce up and down motion and vibrations. A pair of the linear actuators 13 can produce two of up and down motion, pitch motion or roll motion, with or without a passive joint. Three linear actuators 13 can produce up and down motion, pitch motion and roll motion. The motion simulator of FIG. 1 is one among numerous possible configurations for the motion simulator. For example, the motion simulator may support a platform or structure instead of a seat portion, in a flight simulator embodiment, or an end effector in the case of a parallel manipulator or like robotic application. The motion simulator may include the necessary electronics to receive a digital signal with motion content to drive the actuation system 12 in performing movements in synchronization with an audio or video output or a virtual reality session, as described hereinafter.

For context, vibro-kinetic effects refers to vibrations and/or displacements performed by a motion platform and presented to a user as a sensory feedback. By way of non-limiting example, the vibro-kinetic effects may be low amplitude reciprocate movements or vibrations, from 1 micron to 200 mm, it may have a low frequency spectral content, such as 0-5 Hz, 20-100 Hz or 0-200 Hz, and may contain one or more dimension or channel. According to an embodiment, the vibro-kinetic effects are encoded effects, also known as motion samples.

The motion platform 10 may be part of a system featuring a motion controller 20 feeding the motion platform 10 with a motion signal representative of the vibro-kinetic effects to be performed by the motion platform 10. In addition to the example of FIG. 1, a motion platform can take various forms, such as a vibro-kinetic platform for lifting people relative to a structure, a motion platform supporting a seat, a chair with inertial shakers, a portable tactile display for providing haptic feedback, wearable actuators embedded in a vest, etc. Actuators can be of various types, such as linear, rotary, voice coil, resonant, inertial, and the like, and be powered from various source, such as electric (including electromechanical), pneumatic, hydraulic, etc. The motion signal is output from a motion program or motion track that is programmed based on a viewing of the audio-visual output, and comprises actuator-driving instructions to drive the actuators of the motion platform 10 to perform the programmed vibro-kinetic effects in audio-visual output. Other names for the motion signal may include vibro-kinetic signal, motion code, motion samples, data packets of motion, etc. The motion platform 10 may therefore have a digital signal processor and/or driver in order to convert the motion signal received from the motion controller 20 into signals controlling the movements performed by the actuators to displace the seat or platform of the motion platform 10.

It should be noted that although the present disclosure focuses primarily on the seat-shaped motion platform 10, other types of motion platforms, including harnesses, planks, and the like, are also considered. In order to control the movement of the motion platform 10, the motion controller 20 interprets a motion track or other set of instructions which cause the motion controller 20 to induce movements in the motion platform 10 in accordance with the motion track.

Figure 2:
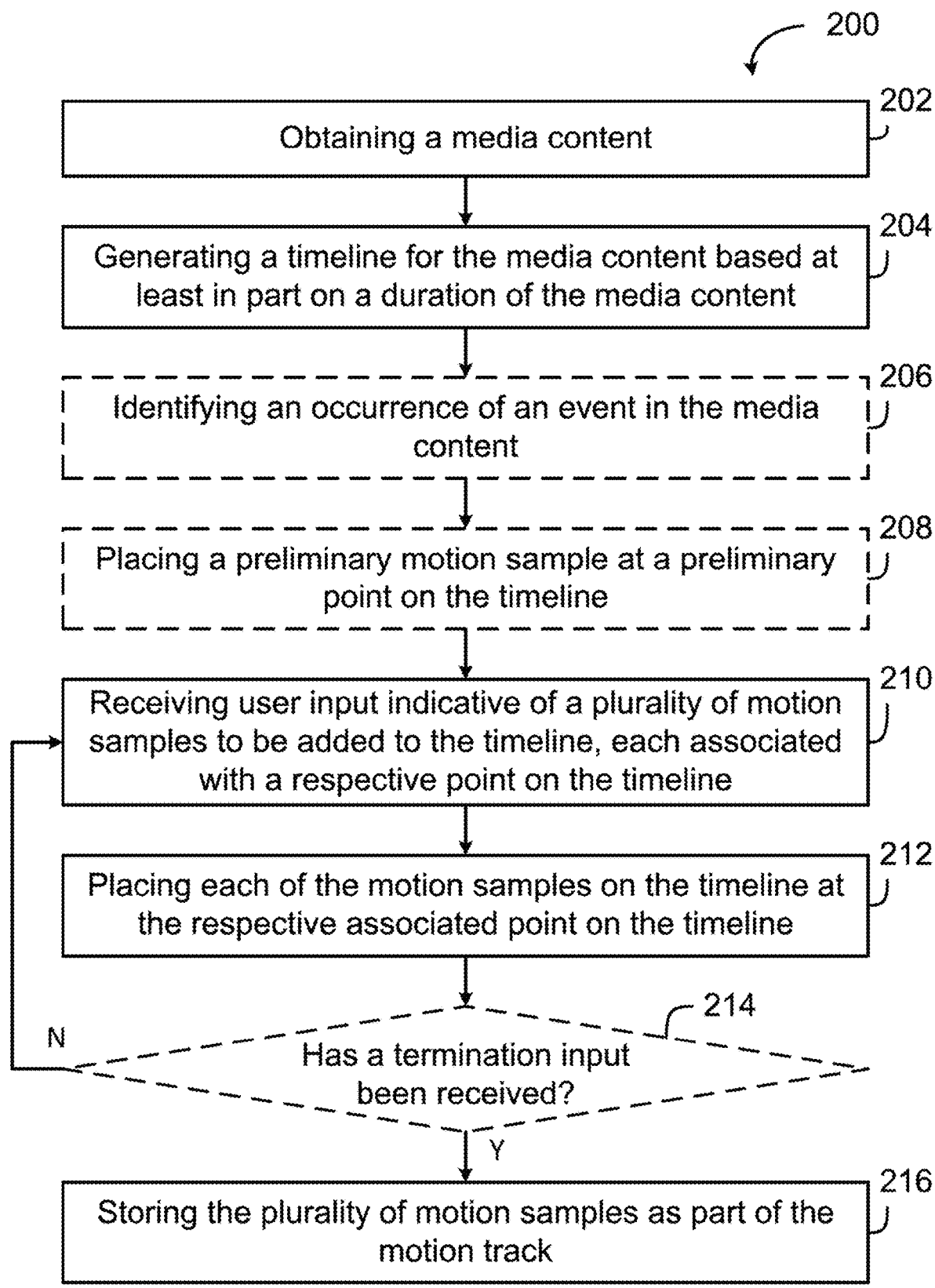
FIG. 2 is a flowchart illustrating an example method of producing a motion track for displacing a motion platform, in accordance with an embodiment.

With reference to FIG. 2, there is shown a method 200 of producing a motion track for displacing a motion platform, for example the motion platform 10. The displacement of the motion platform 10 can be done substantially synchronously with playback of a predetermined media content, for example a movie, a video capture (e.g., action camera), a television show, a video game, a virtual reality environment, a radio drama, a podcast, or any other suitable audio and/or video media content. As discussed in greater detail hereinbelow, some or all of the steps of the method 200 can be performed via a computing device.

At step 202, the media content is obtained. In some embodiments, an identifier of the media content, such as a name, serial number, uniform resource indicator (URI) or other identifying information is obtained, based on which the media content itself can be obtained. In some other embodiments, a uniform resource locator (URL) or a file path is obtained, indicating where the media content is located, either on a local storage medium or on remote storage, for example cloud-based storage. In some embodiments, the media content is obtained with various information about the media content, including a duration, a producer, director, list of actors, etc., a genre, a year of production, and the like.

At step 204, a timeline for the media content is generated, based at least in part on a duration of the media content. The timeline is a mathematical representation of the running time of the media content; the timeline includes a start point, and end point, and a duration which runs between the start and end points. The duration of the media content is used to determine the various parameters of the timeline. In some embodiments, the duration of the media content is obtained alongside the media content obtained at step 202. In some other embodiments, the duration of the media content is obtained by accessing a repository of information pertaining to media content. In still further embodiments, the duration of the media content is entered by a user via a user interface. In other embodiments, in step 204, the media content is analyzed to determine the duration of the media content. Other approaches are also envisaged. As described in greater detail hereinbelow, the timeline will be populated with one or more motion samples to form a motion track, wherein each of the motion samples, when interpreted by the motion controller 20, instructs the motion platform 10 to produce a predetermined movement.

Optionally, at step 206, an occurrence of an event in the media content is identified. The event may consequently be placed on the timeline at its occurrence time position. Various kinds of events, which can be visual, audial, plot-and/or scene-transition-related, and the like, are contemplated, and each event occurs at a particular moment in the media content. For example, a visual event can include the visual presence of a particular character, or the occurrence of an explosion. An audial event can include the sound of a particular character mumbling or whispering, or the sound of a car engine, Foley sound effects, an explosion, a crash and the like. Plot-related events can include the occurrence of developments in the story or characters of the media content, and scene-transition-related events can occur when a scene of the media content shift or changes.

In some embodiments, alongside the media content obtained at step 202, information regarding one or more events which occur in the media content is also obtained. In other embodiments, a user can specify that particular events occur at particular moments in the media content. In still further embodiments, an artificial intelligence (AI) or other software-based tool is used to analyze the media content to identify the occurrence of events. For example, the AI can detect scene transitions via video and/or audio processing of the media content. In another example, the AI can identify the occurrence of particular sound events by comparing with a library of sound samples. Still other techniques for identifying the occurrence of events in the media content are considered. There may consequently result a timeline with visual indication of event occurrences at the appropriate time positions. The visual indication may be accompanied by an indication of the nature of the various events.

Optionally, at step 208, a preliminary motion sample is placed on the timeline. The preliminary motion sample can be placed in response to the identification of the occurrence of the event in the media content at step 206, and be placed at a preliminary point on the timeline which corresponds to the moment in time at which the event occurred in the media content (a.k.a., time position). For example, if a sound event of a car engine is identified at step 206, a motion sample corresponding to the sound event can be placed on the timeline at a preliminary point which corresponds to the moment at which the sound event occurred. In some embodiments, the preliminary motion sample is selected and placed on the timeline by the AI. In other embodiments, other algorithms can be used.

It should be noted that while steps 206 and 208 relate to the identification of the occurrence of an event, and the placing of a motion sample as a result, any number of occurrences of events can be identified as part of step 206, and a commensurate number of preliminary motion samples can be placed on the timeline as a result at the appropriate time positions. In some embodiments, the media content as a whole can be scanned or parsed to identify the occurrence of a plurality of events, and for each event a separate preliminary motion sample can be placed at a respective point on the timeline.

At step 210, user input indicative of a plurality of motion samples to be added to the timeline is received. The user input can be received via any suitable input interface, as will be discussed in greater detail hereinbelow. The user input can be indicative of any suitable number of motion samples, and each of the plurality of motion samples is associated with a respective point on the timeline. The point on the timeline is indicative of the location on the timeline at which the motion sample is to be placed. For instance, the user input can indicate that motion samples associated with a slalom motion are to be added at a point on the timeline which corresponds to a moment in the media content where a character is shown skiing. In another case, the user input can indicate that motion samples associated with an abrupt motion are to be added at a point on the timeline which corresponds to a moment in the media content where a character is shown hitting a table.

In some embodiments, each of the motion samples is associated with a category, for instance based on one or more tags. Upon receipt of user input, a listing of various motion samples can be displayed the user, who can provide further input regarding which motion samples of the listing should be added to the timeline. In other embodiments, each of the motion samples is categorized and listed in one folder of a tree of nested folders. User input for navigating the tree can be received, and the motion samples of various folders can be displayed to the user. Further input regarding selected motion samples to be added to the timeline can additionally be received. Still other forms of user input for adding motion samples to the timeline are considered. It should also be noted that user input associates each of the motion sample with a respective point on the timeline.

In some embodiments, the user input specifies one or more characteristics of and/or modifiers for the motion samples. The characteristics may include duration, amplitude, acceleration, velocity, orientation and direction (e.g., pitch, roll, up and down, etc). For example, the user input can specify that the motion sample should last a predetermined period of time, repeat a predetermined number of times, and the like. In another example, the user input can specify that the motion sample be modified in a particular way. For instance, the motion sample can be amplified to accentuate the movement produced by the motion sample. In another case, the motion sample can be attenuated to produce a more gentle movement than would be produced by the unattenuated motion sample. Still other modifications to motion samples are considered. It should also be noted that user input can also be received for modifying the preliminary motion tracks placed at step 208.

At step 212, each of the motion samples indicated in the user input are placed on the timeline at the associated point, as specified by the user input. Placing the motion samples on the timeline can include adding a visual representation of the motion samples on the timeline, for example as represented in a software-based tool. In some embodiments, the timeline is an array or other data structure, and the motion sample can be stored, as part of the array or other data structure, in association with an indication of the point on the timeline at which the motion sample is placed, for example as a timestamp or other time marker. In another embodiment, the motion samples and a timestamp indicative of the point on the timeline to which the motion samples are associated are stored in a list or other data structure. Still further example are considered.

In some embodiments, a decision step 214 is included whereby a verification can be made regarding whether a termination input has been received, for instance from the user. The termination input can indicate that the user has finished adding and characterizing motion samples to the timeline, whether temporarily or otherwise. If no termination input is received, the method 200 can return to step 210, where additional user input regarding motion samples to be added to the timeline can be received. When a termination input is received, the method 200 can proceed to step 216. In embodiments where the step 214 is omitted, the method 200 can proceed to step 216 from step 212.

At step 216, the plurality of motion samples are stored as part of the motion track. The motion samples can be stored in association with respective time codes which are representative of the point on the timeline where the motion samples were placed. In some embodiments, the motion track is a particular file format or data structure, and the motion samples are stored in the motion track by including the motion samples in the data structure, at the appropriate time position. For example, the array or other data structure in which the timeline is stored can be copied or added to the motion track. In some other embodiments, the motion track is stored on a remote server, for instance in a cloud, and storing the motion samples as part of the motion track comprises transmitting the motion samples and the time codes to the remote server.

Thus, a motion track for a particular media content can be constructed based on user-input motion sample selection. Optionally, to assist the user, certain events in the media content can be identified automatically, and in some cases automatic selection of motion samples for the events is also performed. In this fashion, some or most of the production of the motion track can be done automatically, and additional user input can be used to add or adjust the characteristics of motion samples forming the motion track.

Figure 3:
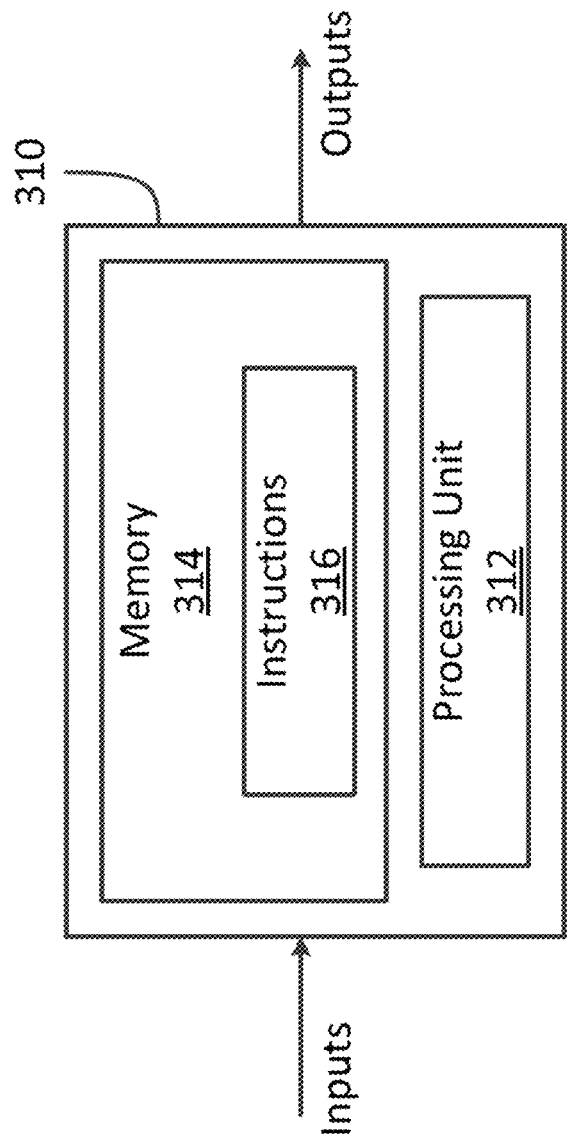
FIG. 3 is schematic diagram of an example computing system for implementing the method of FIG. 2 in accordance with an embodiment.

With reference to FIG. 3, the method 200 may be implemented by a computing device 310, comprising a processing unit 312 and a memory 314 which has stored therein computer-executable instructions 316. The processing unit 312 may comprise any suitable devices configured to cause a series of steps to be performed so as to implement the method 100 such that instructions 316, when executed by the computing device 310 or other programmable apparatus, may cause the functions/acts/steps specified in the methods described herein to be executed. The processing unit 312 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 314 may comprise any suitable known or other machine-readable storage medium. The memory 314 may comprise non-transitory computer readable storage medium, for example, but not limited to, an electronic, magnetic, optical, electromagnetic, infrared, or semiconductor system, apparatus, or device, or any suitable combination of the foregoing. The memory 314 may include a suitable combination of any type of computer memory that is located either internally or externally to the device 310, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 314 may comprise any storage means (e.g., devices) suitable for retrievably storing machine-readable instructions 316 executable by processing unit 312.

Figure 4:
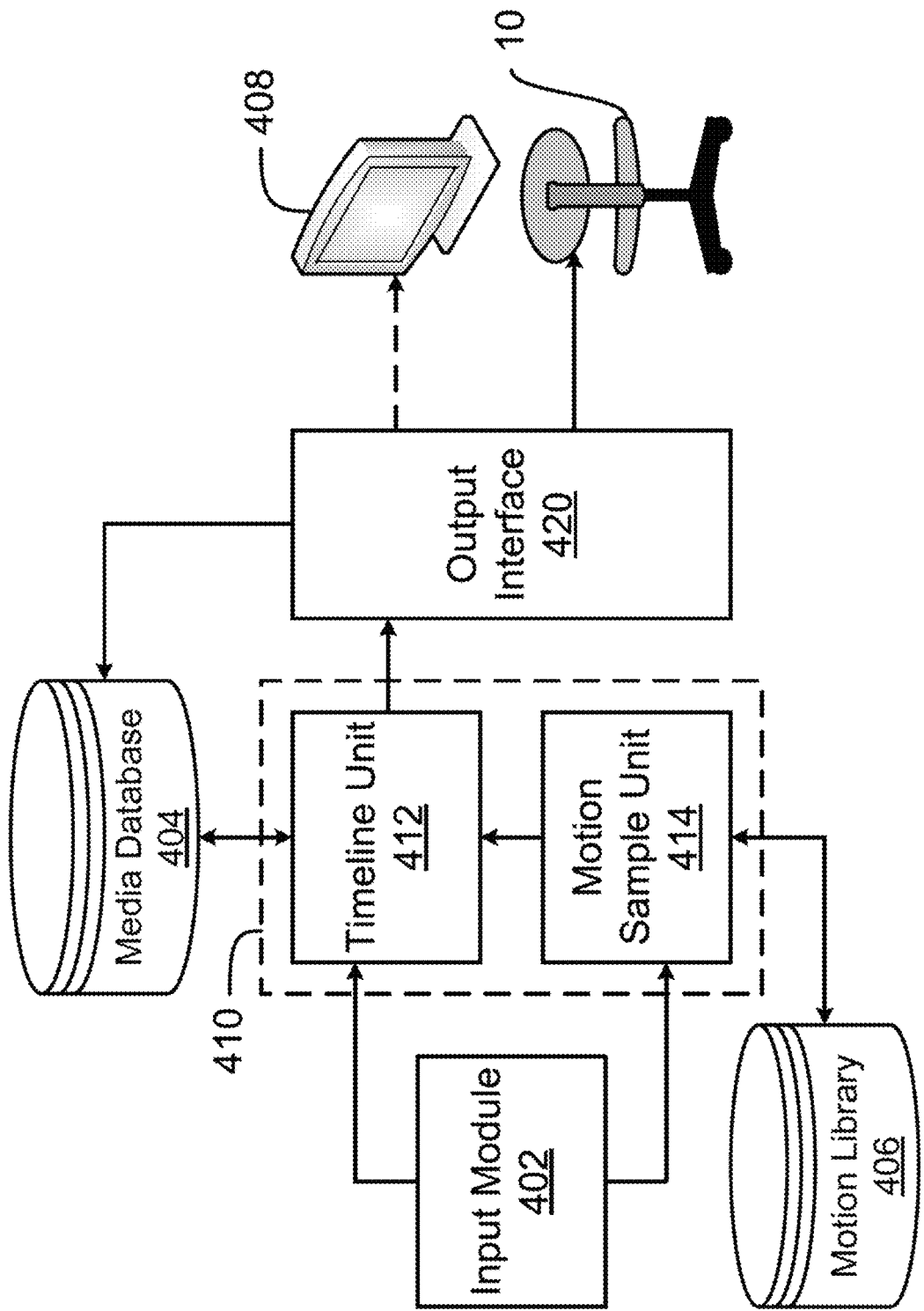
FIG. 4 is a block diagram of an example implementation of a system for producing a motion track, in accordance with an embodiment.

With reference to FIG. 4, an embodiment of a motion track generator 410 is illustrated. The motion track generator 410 can be implemented at least in part by the computing device 310, and can be configured for implementing the method 200. The motion track generator 410 can receive various information from an input module 402, and can access a media database 404 and a motion library 406. The input module 402 can provide input received from a user of the motion track generator 410, for example via a mouse, keyboard, touchscreen, voice-based input device, and the like. The media database 404 stores information relating to various media content, for example a duration of the media content. The motion library 406 serves as a storage location for motion samples, and can store any suitable number of motion samples, for instance in association with tags and/or in a structured file system.

The motion track generator 410 is composed of a timeline unit 412 and a motion sample unit 414, which are coupled to one another. The timeline unit 412 is configured for obtaining the media content, in accordance with step 202, for instance via the input module 402. For example, user input can be received via the input module which specifies a title of the media content, or a file path indicating a storage location of the media content, and the like.

The timeline unit 412 is configured for generating a timeline for the media content, in accordance with step 204. In some embodiments, generating the timeline for the media content includes establishing a data structure or similar construct. The timeline is generated based at least in part on a duration of the media content. In some embodiments, the duration is specified when the media content is obtained. For example, if the media content obtained at step 202 includes a file path for the media content, the timeline unit 412 can inspect metadata stored alongside the media content to identify the duration of the media content. In other embodiments, the timeline unit 412 can access information stored in the media database 404 to determine the duration of the media content. For example, alongside the media content obtained at step 202, a unique identifier, a title, or other information relating to the media content can also be obtained, and by querying the media database 404, the timeline unit 412 can obtain the duration of the media content. Still other approaches for determining the duration of the media content are considered.

In some embodiments, the timeline unit 412 is configured for identifying an occurrence of an event in the media content, in accordance with step 206. For example, the timeline unit 412 can analyze the media content using audio analysis, video analysis, or a combination thereof, to identify the occurrence of events in the media content, along with time positions for the events. In some embodiments, the timeline unit 412 can use artificial intelligence to identify the events in the media content. In conjunction with the motion sample unit 414, preliminary motion samples can be placed at preliminary points on the timeline, in accordance with step 208. For instance the preliminary motion samples may be placed at points on the timeline which coincide with moments in the media content in which there are occurrences of events. The motion sample unit 414 can acquire motion samples from the motion library 406.

For example, the timeline unit 412 can identify the occurrence of one or more explosion events in the media content via an artificial intelligence process. Then, the timeline unit 412 can inform the motion sample unit 414 of the occurrence of the explosion events, and the motion sample unit 414 can acquire one or more explosion motion samples from the motion library 406. Then, the motion sample unit 414 can place an explosion motion sample at points on the timeline which correspond to moments in the media content at which the occurrence of the explosion events were identified.

The motion sample unit 414 can also receive user input from the input module 402 indicative of motion samples to be added to the timeline, in accordance with step 210. Each of the motion samples to be added to the timeline is associated with a respective point on the timeline, i.e., time position; for instance, the user input includes, for each motion sample, an associated point on the timeline. Once the motion sample unit 414 receives the user input, the motion sample unit 414 can fetch motion samples from the motion library 406 and transmit the motion samples and the associated timeline points to the timeline unit 412. The transmission of the motion samples and the associated timeline points to the timeline unit 412 may include modified characteristics of the motion samples, for instance based on user inputs. The timeline unit 412 can then place each of the motion samples provided by the motion sample unit 414 on the timeline at the respective associated points, in accordance with step 212.

In some embodiments, the timeline unit 412 is configured for receiving a termination input, in accordance with step 214, for example via the input module 402. The termination input can be an indication that the user of the motion track generator 410 has completed the timeline, i.e. that no more motion samples are to be added to the timeline.

The timeline unit 412 is additionally configured for storing the plurality of motion samples as part of a motion track, in accordance with step 216. For example, the timeline unit 412 can formalize or complete the timeline, with all the motion samples added thereto, to form the motion track. In some embodiments, the timeline unit 412 can store all of the motion samples added to the timeline as part of a data structure or file. Additionally, in some embodiments, the timeline unit 412 can store the motion track in the media database 404, for example in association with the media content.

The motion track generator 410 is also coupled to an output interface 420, which itself can be coupled to the motion platform 10 (shown schematically in FIG. 4, but for instance similar to the one of FIG. 1), to the media database 404, and, optionally, to a display 408. In some embodiments, once the motion track is complete, the timeline unit 412 can provide the motion track to the output interface 420, which in turn can store the motion track in the media database 404. Once the motion track is stored in the media database 404, it may be accessible to other users, for example via a web portal or other interface. The motion track is consequently configured for being synchronized with the corresponding media content during playback.

The output interface 420 is also configured for providing the motion track to the motion platform 10 to cause the motion platform 10 to move in accordance with the motion samples stored in the motion track, in synchronization with the corresponding media content. In some embodiments, the output interface 420 can retrieve the media content to which the motion track is associated, for example from the media database 404, and also cause the display 408 to present the media content synchronously with the movement of the motion platform 10. The display 408 can be any suitable display, including a television, a monitor, a screen, a projector, a virtual reality headset or other device, and can optionally include audio playback equipment. In some other embodiments, the display 408 can be caused to display the media content via another source, and the output interface 420 provides only the motion track to the motion platform 10.

Figure 5:
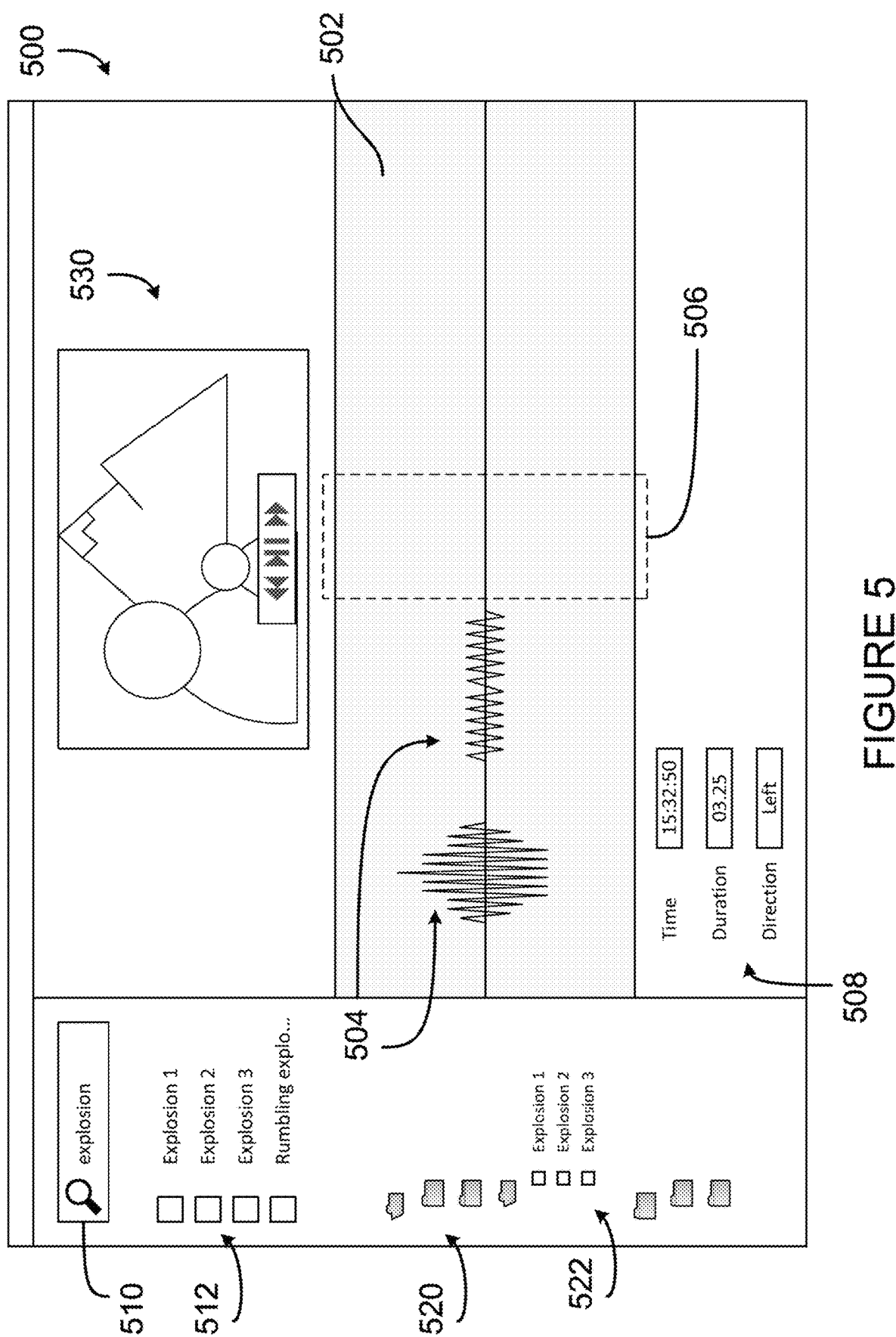
FIG. 5 is an example screenshot of a graphical user interface for producing a motion track in accordance with the method 200.

With reference to FIG. 5, there is shown an example graphical user interface (GUI) 500 via which a timeline can be generated. The GUI 500 displays a timeline 502 on which motion samples can be placed. For example, motion samples 504 have already been placed on the timeline 502, at respective points on the timeline 502. A selection window 506 can indicate that a new point on the timeline has been selected to which a new motion sample is to be added. The GUI 500 can display various information 508 relating to the media content and/or the timeline 502, for example a time point for the selection window 506, a duration of the selection window, or of the media content, a direction of motion to be imparted to the motion platform 10 with the next motion sample, and the like.

In addition, the GUI 500 includes a search box 510 in which user input can be entered to search for motion samples. Results 512 can be displayed based on the search term(s) entered in the search box 510. The search box 510 can provide name-based search, tag- or category-based searching, recency-based searching, or any other suitable searching. Additionally, the GUI 500 can illustrate a file system or other categorization system for the motion samples, which can be browsed, for example in response to user input. Once a subfolder is selected, the motion samples 522 stored or categorized therein can be displayed. Additionally, in some embodiments the GUI 500 includes a video display 530 of the media content, for testing the motion samples 504 as a function of a video excerpt. This may allow the user to adjust the characteristics of the motion samples as a function of what he/she visualizes and experiences.

The methods and systems for producing a motion track for displacing a motion platform substantially synchronous with a predetermined media content described herein may be implemented in a high-level procedural or object-oriented programming or scripting language, or a combination thereof, to communicate with or assist in the operation of a computer system, for example the computing device 310. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the at least one processing unit 312 of the computing device 310, to operate in a specific and predefined manner to perform the functions described herein.

A method of the present disclosure can generally be described as being used for producing a motion track for displacing a motion platform substantially synchronously with a predetermined media content may include: obtaining the media content; in response to receipt of the media content, generating a timeline for the media content based at least in part on a duration of the media content; receiving user input indicative of a plurality of motion samples to be added to the timeline, each associated with a respective point on the timeline; placing each of the motion samples on the timeline at the respective associated point on the timeline; and storing the plurality of motion samples, each in association with a respective time code representative of the respective associated point on the timeline of each of the motion samples, as part of the motion track. The motion track may be described as being used to produce haptic effects and/or viewer effects corresponding to an audio and/or motion track. The haptic effects can be described as being any type of motion of any type of user device, not only of a motion platform. The motion may be defined as vibro-kinetic effects.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

While the methods and systems described herein have been described and shown with reference to particular steps performed in a particular order, it will be understood that these steps may be combined, subdivided or reordered to form an equivalent method without departing from the teachings of the present invention. Accordingly, the order and grouping of the steps is not a limitation of the present disclosure.

Various aspects of the methods and systems disclosed herein, may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

The invention claimed is:

1. A system comprising:
a motion platform having at least one actuator and configured for outputting vibro-kinetic effects in synchronization with at least one of a video output, an audio output and a live event, the motion platform including a seat having a seat portion in which a user may be seated; and
a motion track generator coupled to an output interface, which itself is coupled to the motion platform, the motion track generator including a non-transitory computer-readable medium having stored thereon computer instructions which, when executed by a processing unit, cause the processing unit to implement:
obtaining the media content;
in response to receipt of the media content, generating a timeline for the media content based at least in part on a duration of the media content;
receiving user input indicative of a plurality of motion samples to be added to the timeline, each associated with a respective point on the timeline;
placing each of the motion samples on the timeline at the respective associated point on the timeline; and
storing the plurality of motion samples, each in association with a respective time code representative of the respective associated point on the timeline of each of the motion samples, as part of the motion track.

2. The system of claim 1, the instructions further causing the processing unit to implement, prior to receipt of the user input:
identifying an occurrence of an event in the media content; and
placing a preliminary motion sample at a preliminary point on the timeline, the preliminary motion sample selected based on a nature of the event and the preliminary point selected based on a time at which the event occurred in the media content.

3. The system of claim 2, wherein identifying the occurrence of the media event is based on a visual scene change in the media content.

4. The system of claim 2, wherein identifying the occurrence of the media event is based on sound cues in the media content.

5. The system of claim 4, wherein the sound cues comprise a sound ambiance.

6. The system of claim 4, wherein the sound cues comprise a foley sound effect.

7. The system of claim 2, wherein identifying the occurrence of the event in the media content is performed by an artificial intelligence system.

8. The system of claim 1, wherein the motion samples are each associated with at least one tag, the instructions further causing the processing unit to implement:
receiving additional user input indicative of at least one selected tag; and
presenting at least some of the plurality of motion samples based on the at least one selected tag.

9. The system of claim 1, wherein obtaining the media content comprises obtaining identifying information for the media content, the instructions further causing the processing unit to implement:
extracting an audio sample from the media content;
querying a reference database with the audio sample; and
receiving the identifying information from the reference database.

10. The system of claim 1, the instructions further causing the processing unit to implement storing the motion track in a cloud server.

* * * * *